United States Patent [19]
Horsfield

[11] 3,905,058
[45] Sept. 16, 1975

[54] BACK SUPPORTS

[75] Inventor: David Horsfield, Southam, England

[73] Assignee: Universal Oil Products Company, Des Plaines, Ill.

[22] Filed: Aug. 13, 1973

[21] Appl. No.: 387,973

[30] Foreign Application Priority Data
Aug. 11, 1972  United Kingdom.................... 37469

[52] U.S. Cl.......................................... 5/337; 5/348
[51] Int. Cl............................................. A47g 9/00
[58] Field of Search.... 5/337, 338, 348 R, 349–350; 297/230

[56] References Cited
UNITED STATES PATENTS

| | | | |
|---|---|---|---|
| 3,192,541 | 7/1965 | Moore | 5/349 |
| 3,303,518 | 2/1967 | Ingram | 5/349 |
| 3,348,880 | 10/1967 | Swann | 297/230 |
| 3,764,641 | 10/1973 | Ash | 5/348 R |

Primary Examiner—Paul R. Gilliam
Assistant Examiner—Andrew M. Calvert
Attorney, Agent, or Firm—James R. Hoatson, Jr.; Barry L. Clark; William H. Page, II

[57] ABSTRACT

Cushion for supporting the lumbar region of the back of a seat occupant comprises a sealed envelope or bladder containing a resilient open celled foam member. A valve assembly, which is heat sealed to a corner portion of the bladder, permits the seat occupant to readily adjust the resilience of the cushion. A mounting strap attaches the cushion to the seat.

6 Claims, 6 Drawing Figures

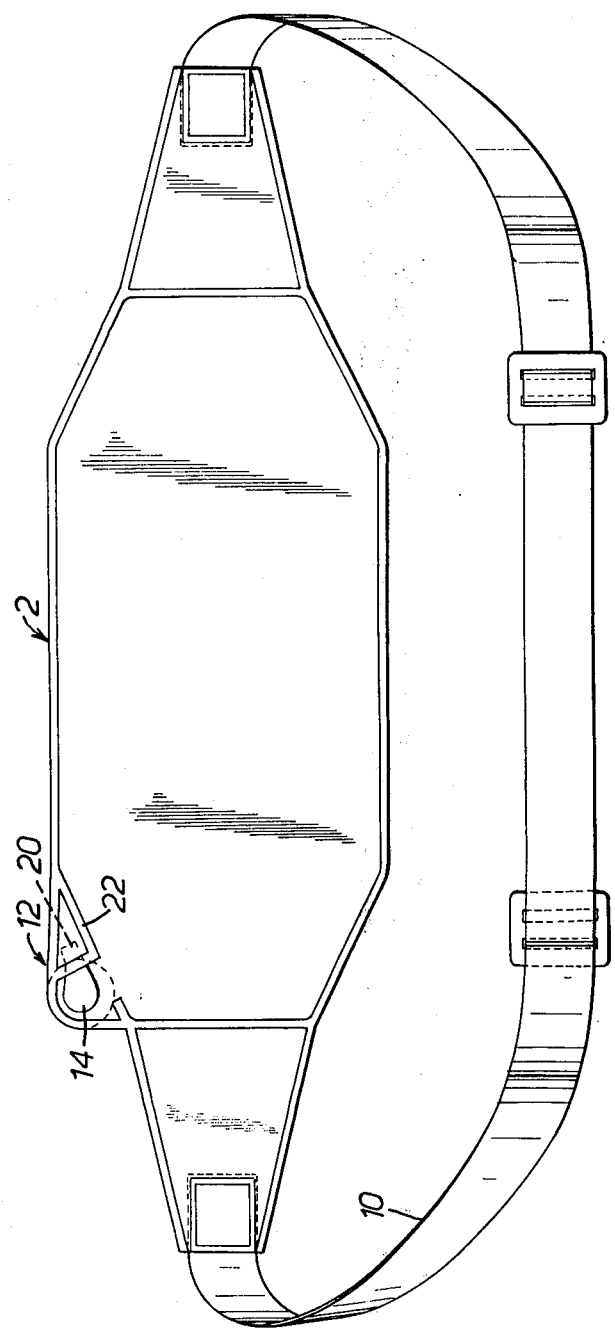
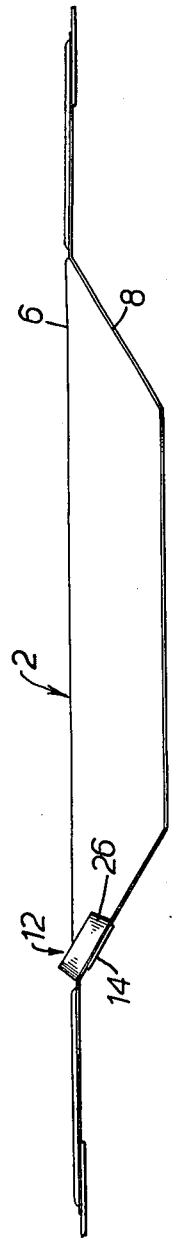
FIG. 1.
FIG. 2.

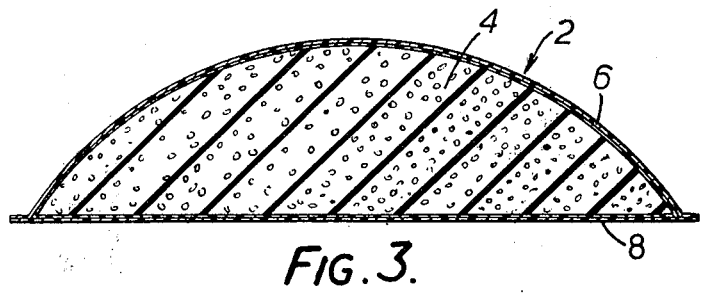
FIG. 3.
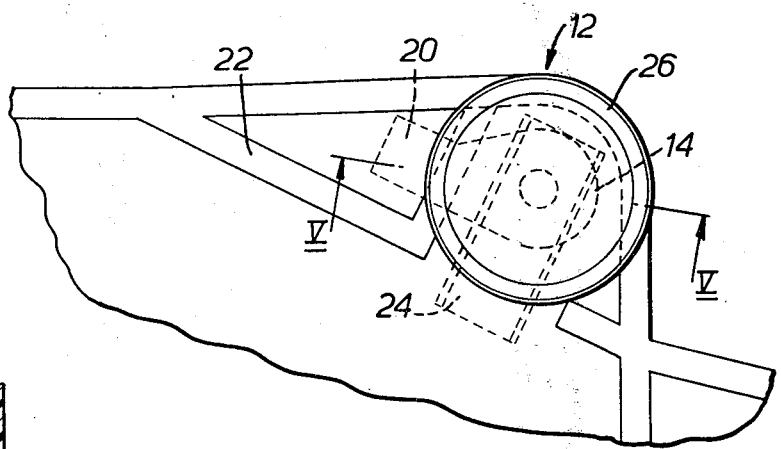
FIG. 4.
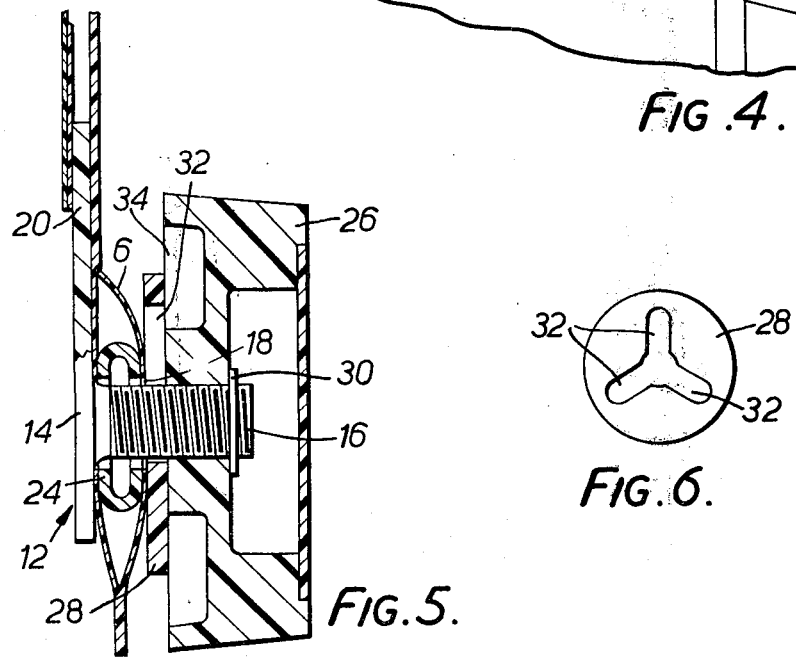
FIG. 5.
FIG. 6.

BACK SUPPORTS

BACKGROUND OF THE INVENTION

The present invention relates to support cushions and more particularly to a support cushion for the lumbar region of the back, for use with a vehicle seat.

The shape of the lumbar region of the back varies widely from person to person and it is therefore substantially impossible to shape the back part of a seat so that the lumbar region of the seat occupant is comfortably supported irrespective of the shape of the lumbar region of the occupant. Many devices have attempted to provide the needed support. For example, U.S. Pat. No. 3,279,849 discloses a lumbar cushion which can be attached to a vehicle seat but has a predetermined resiliency. Lumbar cushions having an adjustable resilience controled by a remote valve means are also known, having been built into the back cushions of aircraft seats. It is also known to form life preservers with open celled material in a sealed chamber. U.S. Pat. No. 2,803,023 shows such a device having an attached metal valve for permitting sufficient air to be let out to allow the device to be used comfortably as a seat cushion.

SUMMARY

It is an object of the present invention to provide a lumbar cushion which may be readily attached to the back of a seat, and especially a vehicle seat; which is economical to produce; and which has a simple valve which does not interfere with the seated occupant and is readily actuated while the occupant is seated.

According to the present invention, there is provided a support cushion comprising a bladder, a resilient filling material within the bladder, an air flow passage communicating with the interior of the bladder, and a valve assembly for controlling the air flow through the passage, the valve assembly comprising a clamping device operative to clamp together the walls of the passage whereby to close the passage.

Further according to the present invention, there is provided a back support cushion for a vehicle seat, said cushion comprising a bladder, means for attaching the bladder to a vehicle seat, a resilient open-celled filling material within the bladder, a tube defining an air flow passage leading into the bladder, and a valve assembly comprising a screw-operated clamping device operative to clamp together the walls of the tube whereby to close the passage and to seal the bladder.

An embodiment of the invention will now be described, by way of example only, with reference to the accompanying diagrammatic drawings, in which:

FIG. 1 is a rear elevation of a lumbar support cushion in accordance with the present invention;

FIG. 2 is a plan view of the support cushion;

FIG. 3 is a transverse section of the support cushion;

FIG. 4 is a fragmentary front elevation, to an enlarged scale, of the support cushion and showing a control valve of the cushion;

FIG. 5 is a section taken on line V—V of FIG. 4; and

FIG. 6 is an elevation of a washer of the control valve.

As shown in the drawings, a lumbar support cushion for use with a vehicle seat comprises a flexible bladder 2, enclosing a foam support body 4. The bladder can be provided with a suitable covering. Preferably, the bladder 2 comprises two layers 6, 8 of PVC or other plastics material welded together along their edge portions, and the foam support body 4 comprises a slab of an open-celled, relatively firm, foamed material, for example polyurethane foam. In one practical form of the lumbar support cushion, the foam slab 4 has a density of 30.5 – 32.5 kg/m$^3$ and a hardness of 10 – 13 kg when tested in accordance with BS3667.

The foam slab 4 is elongate, the rear face of the slab 4 being substantially plane and the front face of the slab 4 being arcuate in transverse cross-section; the bladder 2 assumes a similar shape to that of the foam slab 4. When a load is applied to the lumbar support cushion by the back of a seat occupant, the foam slab 4 will be resiliently compressed, and acts as a spring which expands to restore the bladder 2 to its original shape when the load is removed.

The support cushion can be detachably secured to the back part of the seat by a strap or straps carried by the bladder 2. For this purpose, a single strap 10 to extend horizontally around the back part is anchored at each end of the support cushion between the plastics layers 6, 8 of the bladder 2, the anchorage being provided by welding the strap 10 to the bladder 2. Alternatively, two laterally spaced straps to extend vertically around the back part can be anchored in a similar manner to the top and bottom edges of the bladder. Instead of using straps, the support cushion can be secured to the back part of the seat by a touch and close fastener of the "Velcro" (Registered Trade Mark) type.

Air can be expelled from, or admitted into, the bladder 2 through a control valve 12 incorporated in a corner position of the bladder 2. The valve comprises a mounting plate 14 lying flush against the outer surface of the rear face of the bladder 2, and carrying a threaded stud 16 projecting forwardly through an aperture in the two layers 6,8 of the bladder 2; an annular clearance which defines an air inlet/outlet opening 18, is formed between the stud 16 and the front layer 6 of the bladder 2. A lug 20 integral with the plate 14 extends into the interior of the bladder through a slit in the rear layer 8 of the bladder 2 and serves to locate the plate 14 relative to the bladder 2; the portion of the bladder in which the lug 20 is located is isolated from the remainder of the bladder by an L-shaped welded seam 22 which defines, with the seam at the adjacent edge of the bladder 2, a lug-receiving pocket.

A flexible tube 24, of PVC or other suitable material is located within the bladder 2, and has a pair of opposed apertures formed in its wall at one end portion, the other end portion of the tube being directed towards the central portion of the interior of the bladder. The stud 16 extends through the apertures with a clearance whereby the tube can communicate with the air inlet/outlet opening 18 to form an air-flow passage.

A manually-rotatable knurled knob 26, having an internally-threaded bore, is mounted on the front end portion of the stud 16 forwardly of the front layer 6 of the bladder 2, a washer 28 being interposed between the knob 26 and the front layer 6 of the bladder 2. Rotation of the knob 26 in a sense to move the knob away from the mounting plate 14 is limited by a spring clip 30 engaged in an annular groove at the forward end of the stud 16. Preferably, the plate, stud, washer, and knob are formed from rigid PVC or other plastics material.

As can be seen from FIG. 6 the washer 28 has a number of slots 32 extending radially from its central opening; as shown, the washer 28 has three slots 32 angularly spaced by 120° about the axis of the washer 28. The rear surface of the knob 26 is formed with an annular groove 34 having an outer periphery lying radially beyond the outer edge of the washer 28, and an inner periphery lying within the length of the radial slots 32. In this manner, the air inlet/outlet opening 18 can communicate with the atmosphere through the radial slots 32 and the annular groove 34 in the knob.

When the knob 26 is abutting the spring clip 30 on the stud 16, the tube 24 is in a relatively expanded condition whereby air can flow through the tube 24, into or out of the bladder 2, via the air inlet/outlet opening 18 and the radial slots 32. By rotating the knob 26 so as to move the knob towards the mounting plate 14, the tube 24 is progressively compressed or flattened between the washer 26 and the mounting plate 14 until the tube and bladder material are flattened to such an extent that air can no longer flow through the tube 24 and thus into, or out of, the bladder 2. As will be apparent, the mounting plate 14 and the washer 28 in effect constitute opposed clamping members located on respective sides of the tube 24. Rotation of the knob 26 in the reverse sense enables the tube 24 to expand so that air flow into or out of the bladder 2 can continue. Preferably, the pitch of the thread on the stud 16 is such that the knob 26 can be moved from a position abutting the spring clip 30 (corresponding to the fully "open" condition of the tube 24) to a position at which the tube is held in a fully closed condition by rotation through about 1 revolution.

In use, the knob 26 is moved to its position abutting the spring clip 30 and a load is applied to the support cushion by the seat occupant whereby air is expelled from the bladder 2 through the tube 24. When sufficient air has been expelled to enable the bladder 2 to form a comfortable fit against the lumbar region of the occupant, the knob 26 is rotated to close the tube 24. To re-inflate the bladder, the load is removed from the cushion and the knob 26 is rotated in the reverse sense to permit air to be drawn into the bladder 2 through the tube 24 during expansion of the foam slab 4.

I claim as my invention:

1. A support cushion comprising a bladder, an open-celled resilient filling material within the bladder, a resilient tube communicating with the interior of the bladder and a valve assembly for controlling the air flow through the passage, the valve assembly comprising a clamping device having opposed clamping members on opposite sides of the tube and including a fixed portion sealed to portions of the bladder and a movable portion positioned externally of the bladder and cooperating with the fixed portion to clamp together the walls of the passage whereby to close the resilient tube, said fixed portion comprising a threaded stud rigid with one of the clamping members and extending transversely through the tube, and the movable portion comprises a threaded knob mounted on the stud, the other clamping member being interposed between the knob and the tube.

2. A cushion as claimed in claim 1, wherein the clamping members are located externally of the bladder.

3. A cushion as claimed in claim 1 and further comprising means for attaching the bladder to a vehicle seat.

4. A cushion as claimed in claim 3, wherein said bladder and valve assembly are plastic and the said one clamping member comprises a first plate located adjacent one face of the bladder, said threaded stud passing through opposed apertures in the walls of the resilient tube and through an aperture in an opposite face of the bladder, a clearance area existing between the stud and the said apertures, said other clamping member comprising a second plate mounted on the stud externally of the said opposite face of the bladder, said knob being manually rotatable to clamp the tube and the two faces of the bladder between the first and second plates.

5. A cushion as claimed in claim 4, wherein the second plate includes at least one radially extending slot and said knob includes a recessed groove in its rear surface adapted to intersect said slot so as to form an air passage from the atmosphere to the clearance area when the knob is rotated in one direction.

6. A cushion as claimed in claim 5 wherein a retaining member is mounted adjacent one end of said threaded stud to limit the rotational movement of said knob in said one direction.

* * * * *